(12) United States Patent
Rolin et al.

(10) Patent No.: US 11,443,031 B2
(45) Date of Patent: Sep. 13, 2022

(54) METHOD FOR DETERMINING A VALIDITY OF AN APPLICATION CODE, CORRESPONDING DEVICE AND COMPUTER PROGRAM PRODUCT

(71) Applicant: Banks and Acquirers International Holding, Paris (FR)

(72) Inventors: Christian Rolin, Guilherand-Granges (FR); Maxime Bernelas, Chatuzangle-le-Goubet (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 140 days.

(21) Appl. No.: 16/456,533

(22) Filed: Jun. 28, 2019

(65) Prior Publication Data
US 2020/0004952 A1    Jan. 2, 2020

(30) Foreign Application Priority Data

Jun. 29, 2018  (FR) ...................................... 1856056

(51) Int. Cl.
*G06F 21/51*       (2013.01)
*G06F 21/12*       (2013.01)
(Continued)

(52) U.S. Cl.
CPC ............ *G06F 21/51* (2013.01); *G06F 21/121* (2013.01); *G06F 21/565* (2013.01); *G06F 21/577* (2013.01); *G06F 2221/033* (2013.01)

(58) Field of Classification Search
None
See application file for complete search history.

(56) References Cited

U.S. PATENT DOCUMENTS

| 2006/0047933 A1* | 3/2006 | Morais ................ G06F 12/1408 |
| | | 711/163 |
| 2012/0079246 A1* | 3/2012 | Breternitz, Jr. ........... G06F 8/52 |
| | | 712/208 |

(Continued)

FOREIGN PATENT DOCUMENTS

| EP | 2362314 A1 | 8/2011 |
| EP | 2026558 A1 | 6/2016 |

(Continued)

OTHER PUBLICATIONS

French Search Report dated Feb. 12, 2019 for corresponding French Application No. 1856056, filed Jun. 29, 2018.

(Continued)

*Primary Examiner* — Peter D Nolan
*Assistant Examiner* — Roy Rhee
(74) *Attorney, Agent, or Firm* — David D. Brush; Westman, Champlin & Koehler, P.A.

(57) ABSTRACT

A method for determining validity of a code of an application. The method is implemented within an electronic device having a processor, a non-secure memory and a secure memory. The method includes at least one iteration of: loading the application in the non-secure memory, delivering a current application code; determining a current footprint of the current application code; obtaining, within the secure memory, a reference footprint associated with the application; comparing the current footprint with the reference footprint; and when the current footprint is identical to the reference footprint, validating the current application code, including: executing an optimization process of the current application code, delivering an optimized application code; determining a post-optimization footprint of the optimized application code; and recording the post-optimi- (Continued)

Figure 1:
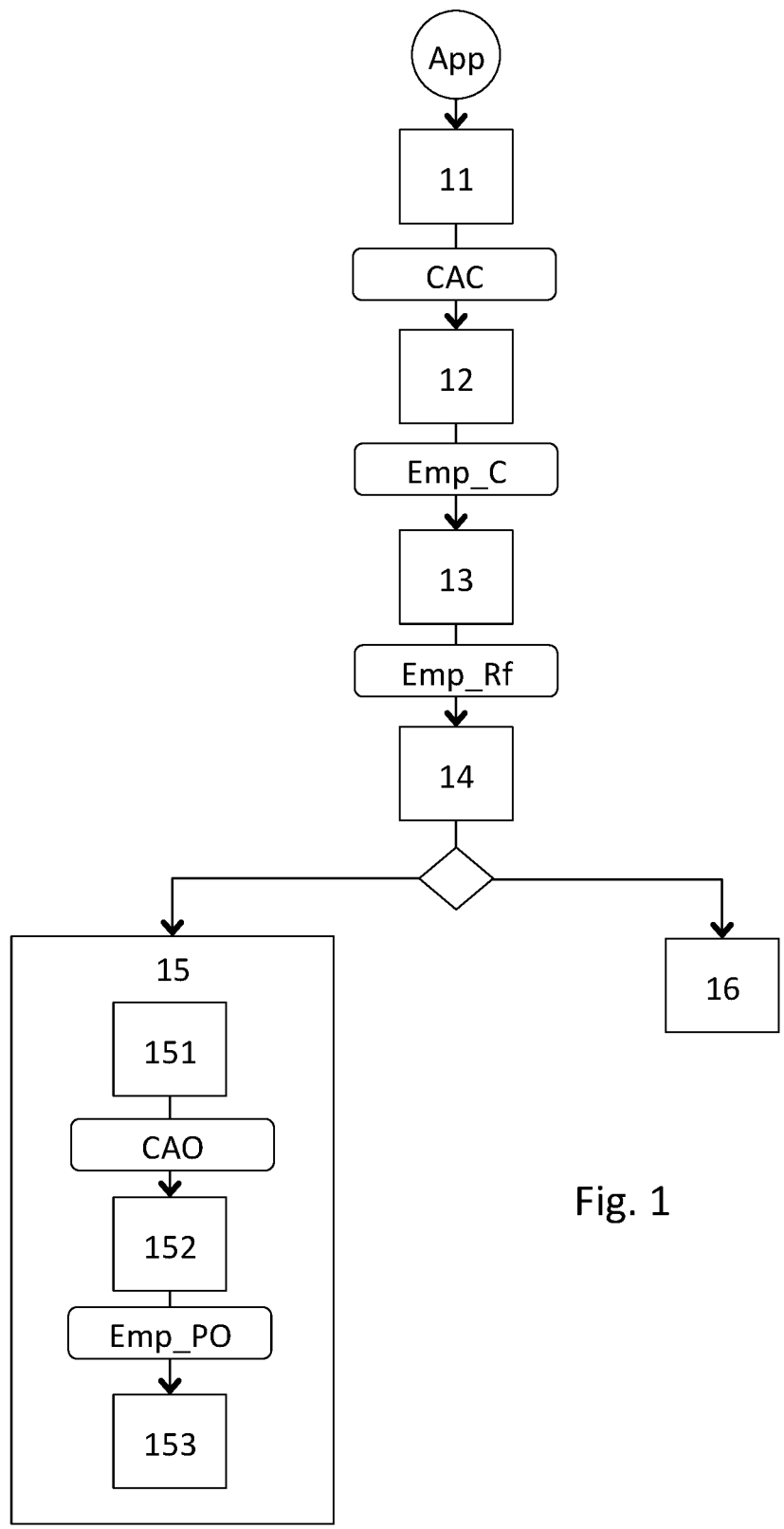

zation footprint in the secure memory as a new reference footprint associated with the application.

10 Claims, 2 Drawing Sheets

(51) Int. Cl.
*G06F 21/56* (2013.01)
*G06F 21/57* (2013.01)

(56) References Cited

U.S. PATENT DOCUMENTS

| | | | |
|---|---|---|---|
| 2012/0291126 A1* | 11/2012 | Lagar-Cavilla | G06F 21/56 726/22 |
| 2016/0227406 A1* | 8/2016 | Waller | H04N 21/44236 |
| 2017/0262657 A1* | 9/2017 | Salmon-Legagneur | G06F 21/51 |

FOREIGN PATENT DOCUMENTS

| | | |
|---|---|---|
| EP | 3026560 A1 | 6/2016 |
| WO | 2016105927 A1 | 6/2016 |

OTHER PUBLICATIONS

English translation of the Written Opinion of the French Searching Authority dated Feb. 12, 2019 for corresponding French Application No. 1856056, filed Jun. 29, 2018.
Machine translation of European Notification under Article 94 (3) EPC dated Oct. 14, 2021 for parallel European Application No. 19 180 688.4.

\* cited by examiner

METHOD FOR DETERMINING A VALIDITY OF AN APPLICATION CODE, CORRESPONDING DEVICE AND COMPUTER PROGRAM PRODUCT

1. FIELD OF THE INVENTION

The field of the invention is that of electronic devices used to implement software applications. More particularly, the invention relates to devices used to carry out operations that bring into play or relate to confidential objects or items (such as payment operations for example) and are required, on this basis, to comply with certain security requirements defined especially in the context of standards or certifications.

2. PRIOR ART

Certain electronic devices, such as payment terminals for example, are specifically designed in both hardware and software terms to offer the most optimal protection possible to confidential data that can be entered or stored therein. In order to ensure an adequate level of security, standards have been created and certification procedures have been developed in order to establish the compliance of such devices with standards. By way of an illustration, the use of payment terminals is subject to a security regulation that is compulsory and imposed: these terminals must thus be certified as being compliant with PCI (payment card industry) standards such as for example the PCI-PED (payment card industry-pin entry device) standard. These standards define security requirements in terms of the physical design of the equipment as well as the software part implemented within these devices. For example, sensitive data must generally be encrypted, and its processing is subjected to cryptography protocols. It is also generally required that software components that can be implemented only within secure processors inaccessible to third parties be used.

One trade-off for this high level of security is that the flexibility of use offered by such devices remains limited. Certifying an application so that it can be authorized for execution in the secure processor of the device is often lengthy and entails constraints. In a world with a wealth and variety of electronic devices such as mobile telephones, personal digital assistants or microcomputers, a need is being felt for comparable flexibility in electronic devices intended for operations that use or relate to confidential objects or items, also called secure devices. It is known that operating systems commonly called open-source operating systems offer an abundance of useful and friendly applications that are worth implementing to satisfy this need for flexibility in secure devices. Thus, secure electronic devices increasingly include not only a secure processor but also a non-secure processor capable of executing third-party applications, for example applications that can be downloaded onto a distribution platform or hub made available by the manufacturer of the electronic device. This opening to other than strictly secure software applications has the drawback of potentially endangering the security of the data entered into the secure device. Thus, a malicious application could spy on and betray security processes for equipment in order to retrieve confidential information. Such a malicious application could also mimic the appearance of a legitimate application (for example a payment application) in order to deceive a user and thus retrieve his information. There are existing solutions to limit these risks that remain compliant with the predefined security requirements. For example, installation packets for applications available on the manufacturer's distribution hub can be electronically signed by means of a manufacturer's cryptographic key. The signing of the installation packet is then verified by the electronic device at the time of installation of the application. Thus, when it is installed, the application is considered to be trustworthy because its origin is certified and because it has been distributed through a platform that is known and, in principle, guarantees a certain level of quality: before being proposed for distribution on the manufacturer's platform, the application is supposed to have been tested and confirmed as being compliant as regards security. Such measures however do not guarantee the integrity of the executable code of the application throughout its service life, from the time of its installation to its updating or elimination from the electronic device. Indeed, the code of an application can be corrupted—for example polluted by malicious execution sequences—after the installation of an application without detection. On the contrary, any modification of the code of an application apart from the time of its installation or the time of an update does not necessarily result from a malicious operation: the modification can for example be the result of a legitimate operation for optimizing a code implemented by the operating system of the electronic device. For example, the Android™ operating system incorporates processes for optimizing the code of the applications according to their use. Such modifications then should not be deemed to put into question the integrity of the application code since they are the result of known, controlled and authorized operations.

There is therefore a need to propose solutions aimed at ensuring that the integrity of the code of an application is preserved throughout its service life, especially well after it has been installed on an electronic device. Such solutions should especially make it possible to verify the validity of the code of an application, even when this code is the object of continued optimization that can make it evolve.

3. SUMMARY

The proposed technique offers a solution that does not have at least some of the problems of the prior art, through an original method for determining a validity of a code of an application. This method is implemented within an electronic device comprising a processor, a non-secure memory and a secure memory. According to the proposed technique, this method comprises at least one iteration of the following steps:
- a step for loading said application in said non-secure memory, delivering a current application code;
- a step for determining a footprint of said current application code, delivering a current footprint associated with said application;
- a step for obtaining, within said secure memory, a reference footprint associated with said application;
- a step for comparing said current footprint with said reference footprint; and
- when said current footprint is identical to said reference footprint, a step for validating said current application code, comprising a step for executing an optimization process of the current application code of said application, delivering an optimized application code.

In this way, the validity of the code of an application can be verified at any time during the service life of the application, even after its installation on the electronic device. In this way, it is additionally made sure that the execution of a process for optimizing the code of the application is carried out on a healthy application code which has not undergone unauthorized modifications. Thus, the modifications that result from the execution of the process for optimizing this code, which are modifications that are authorized and accepted as not bringing the validity of the application code into question, deliver an optimized application code that is itself also considered to be healthy (i.e. valid).

In one particular embodiment, said step for validating the current application code furthermore comprises:
- a step for determining a footprint of said optimized application code delivering a post-optimization footprint associated with said application;
- a step for recording said post-optimization footprint in said secure memory as a new reference footprint associated with said application.

In this way, any authorized modification of the application code leads to the updating, in the secure memory of the electronic device, of the reference footprint associated with the application code. Thus, the method for determining the validity of the code of the application can be implemented regularly throughout the service life of the application and the mechanism for verifying the integrity of the code according to the proposed technique remains reliable and robust, even when the code of the application undergoes continuous optimization.

In one particular embodiment, said method for determining a validity of a code of an application comprises a step for initializing said reference footprint implemented during an installation of said application on said electronic device.

According to one particular characteristic of this embodiment, said step for initializing the reference footprint comprises:
- a step for verifying a signature of at least one installation packet of said application; and
- when said verification of a signature is positive:
  - a step for obtaining a first reference footprint for said application;
  - a step for recording said first reference footprint in said secure memory.

In this way, an initial reference footprint which corresponds to the first reference footprint stored in the secure memory for the application considered, is determined at a time when the application code is considered to be valid since this instant coincides with a phase of installation of the application that already incorporates its own mechanisms for verifying the integrity of the code.

In one particular embodiment, said method for determining a validity of a code of an application comprises, when said current footprint is different from said reference footprint, a step for implementing at least one protection measure.

Thus, unauthorized modifications of the application are detected, and various measures can be implemented in order to protect the data entered or registered in the electronic device.

According to one particular characteristic of this embodiment, said at least one protection measure belongs to the group comprising:
- the display of a warning message on a screen of said electronic device;
- the blocking of any data transmission addressed to said application;
- the blocking of said application;
- the blocking of said electronic device.

Thus, the electronic device has various means at its disposal that can be used alone or in a complementary role, to warn a user that an application has undergone unauthorized modifications, and, if necessary, to make this application inoperable. These means can include the partial or total blocking of the incriminated application. In the face of a situation considered to be particularly critical, for example, such a blocking can be extended to the entire electronic device.

In one particular embodiment, the current footprint and the reference footprint associated with this application are determined by the implementing of a hash function.

Thus, the current footprint associated with the application and the reference footprint associated with the application are hash values, and the hash function used can be chosen so as to limit the size taken up by the footprints in the memory of the electronic device.

In one particular embodiment, said method for determining a validity of an application code comprises, prior to said step for executing an optimization process, a step for verifying the integrity of the code of the optimization process comprising:
- a step for determining a footprint of the code of said optimization process delivering a current footprint associated with said optimization process;
- a step for obtaining, in said secure memory, a reference footprint associated with said optimization process;
- a step of comparison of said current footprint associated with the optimization process with said reference footprint associated with the optimization process; and
- when said current footprint associated with the optimization process is identical to the reference footprint associated with the optimization process, the implementing of said step for executing said optimization process;
- when the current footprint associated with the optimization process is different from the reference footprint associated with the optimization process, the suspension of said step for executing the optimization process.

In this way, the code of the optimization process is itself the object of a verification of integrity, the result of which conditions the execution of this process. Thus, it is made sure that the optimization process is not itself corrupted before authorizing its execution.

According to another aspect, the proposed technique also relates to an electronic device that comprises a processor, a non-secure memory and a secure memory. Such an electronic device also comprises:
- means for loading an application into said non-secure memory delivering a current application code;
- means for determining a footprint of said current application code delivering a current footprint associated with said application;
- means for obtaining, within said secure memory, a reference footprint associated with said application;
- means of comparison of the current footprint with the reference footprint; and
- means for validating said current application code implemented when said current footprint is identical to said reference footprint, said means for validating comprising means for executing a process of optimization of the current application code of said application, delivering an optimized application code.

In one particular embodiment, said means for validating the current application code furthermore comprises:
- means for determining a footprint of said optimized application code delivering a post-optimization footprint associated with said application;
- means for recording said post-optimization footprint in said secure memory as a new reference footprint associated with said application.

In one particular embodiment, the electronic data-entry device is a payment terminal. Thus, such a payment terminal, secured by the implementation of the techniques described here above, is capable of withstanding attacks consisting of the modification of an application when it is installed or subsequently to its installation or during its updating. This embodiment thus allows a user to install an open-source application and at the same time prevents a malicious act in which this application is infected in order to contaminate the payment terminal with a third-party application or an unauthorized service. It is thus possible to combine the openness procured by the installation of numerous applications as well as the security needed to implement payment data.

According to an exemplary implementation, the different steps of the method for determining a validity of a code of an application according to the proposed technique are performed by one or more software programs or computer programs, comprising software instructions that are to be executed by a data processor according to the proposed technique and are designed to control the execution of the different steps of the methods.

An exemplary embodiment of the of the disclosure is therefore aimed at providing a program capable of being executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever.

An exemplary embodiment is also aimed at providing an information carrier or medium readable by a data processor, and comprising instructions of a program as mentioned here above.

The information medium can be any entity or device whatsoever capable of storing the program. For example, the medium can comprise a storage means such as a ROM, for example, a CD ROM or microelectronic circuit ROM or again a magnetic recording means, for example a floppy disk or a hard disk drive.

Besides, the information medium can be a transmissible medium such as an electrical or optical signal, that can be conveyed by an electrical or optical cable, by radio or by other means. The program according to an exemplary embodiment the invention can be especially downloaded from an Internet type network.

As an alternative, the information medium can be an integrated circuit into which the program is incorporated, the circuit being adapted to execute or to be used in the execution of the method in question.

According to one embodiment, the proposed technique is implemented by means of software and/or hardware components. In this respect, the term "module" can correspond in this document equally well to a software component and to a hardware component or to a set of hardware and software components A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing the hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the module concerned. It can be a programmable hardware component or a component with an integrated processor for the execution of software, for example, an integrated circuit, smart card, a memory card, an electronic board for the execution of firmware etc.

Each component of the system described here above can of course implement its own software modules.

The different embodiments mentioned here above can be combined with one another to implement the proposed technique

4. LIST OF FIGURES

Figure 2:
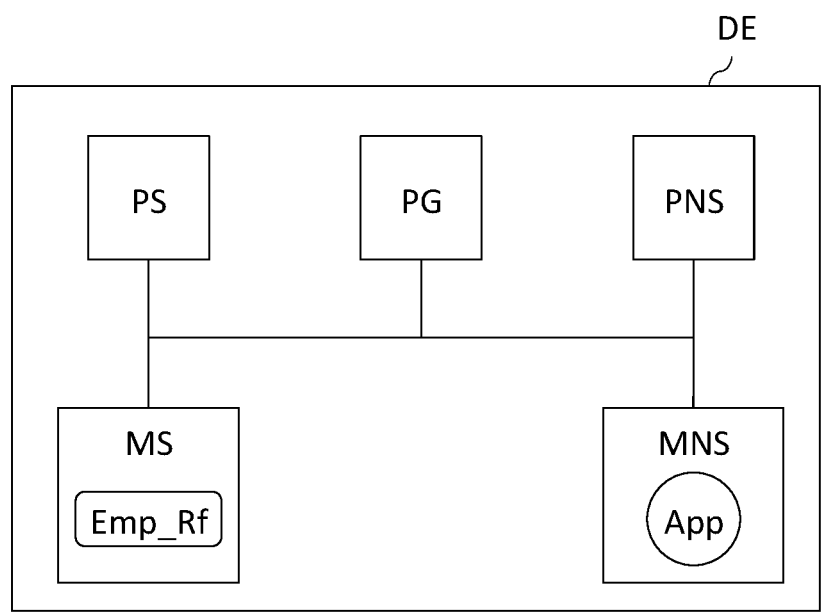

Other features and advantages shall appear more clearly from the following description of an exemplary embodiment of the proposed technique, given by way of a simple illustratory and non-exhaustive example and from the appended drawings, of which:

FIG. 1 illustrates the steps implemented to carry out the method for determining a validity of a code of an application, according to one particular embodiment of the proposed technique;

FIG. 2 describes an example of an electronic data-entry device capable of implementing the proposed technique, in one particular embodiment of the proposed technique.

5. DETAILED DESCRIPTION 5.1. General Principle and Presentation of One Embodiment The general principle of the proposed technique consists in verifying the validity of the code of an application, subsequently to its installation on an electronic device. "Verifying validity", also called "verifying integrity" in the present description, is understood to mean the fact of ensuring that the application code has not undergone unauthorized modifications of potentially malicious origin. Such unauthorized modifications could for example enable an attacker, without the user's knowledge, to fraudulently retrieve confidential information (such as for example payment information) stored in or entered into the electronic device. However, authorized modifications of the application code, such as the one resulting from a known and legitimate optimization process, are not deemed to bring into question or cast doubt on the validity or integrity of the application code. According to an example of the proposed technique, the verification of the validity of the code of an application is implemented regularly. Thus, an exemplary embodiment of the disclosure increases the chances of detecting an unauthorized modification of the application throughout its service life, i.e. between the time of its installation in a given version on the electronic device and the time of its subsequent update to another version or its elimination from the electronic device. More particularly, an exemplary embodiment of the disclosure proposes to make the execution of a process of optimization of the application code—also called a current application code—conditional on the preliminary verification that the current application code is truly valid. Thus it is made sure that the optimization process acts on a code having integrity. Thus, the optimized application code produced by the optimization process can also be deemed to have integrity.

Referring to FIG. 1, we present an example of an implementation of the method for determining a validity of a code of an application App in one particular embodiment of the proposed technique. The application App is installed within an electronic device comprising a processor, a secure memory and non-secure memory. A more detailed description of an electronic device capable of implementing such a process in one particular embodiment is given here below. The method comprises at least one iteration of the steps described here below.

At first, a step 11 for loading the application into the non-secure memory of the device is implemented. At the end of this step, the processor has access to a current application code CAC of the application, enabling it if necessary to execute said application.

The processor then, in a step 12, determines a footprint Emp_C of the current application code. According to one particular characteristic, this footprint, which corresponds to a current footprint associated with said application, is obtained by applying a hash function (for example, the function MD5 or the function SHA1) to the current application code CAC. The hash footprint (or hash value) obtained thus forms a cryptographic condensate representing the current application code without its being possible to retrieve the current application code (i.e. obtain it by an inverse operation) from this hash footprint.

In a step 13, the processor also obtains, within the secure memory, a reference footprint Emp_Rf associated with the application App. In one particular embodiment of the proposed technique, this reference footprint has been initialized a first time at the installation of the application on the electronic device (during the installation process, or else immediately thereafter). According to one particular characteristic of this embodiment, the reference footprint Emp_Rf is especially determined after verification of the signature of at least one installation packet of the application and then recorded in the secure memory. In one embodiment, when the footprints are determined by application of a hash function, the same hash function is obviously used to determine the reference footprint Emp_Rf and to determine the footprint Emp_C of the current application code. The obtaining of the reference footprint by the processor can be done by means of a secure processor, which is the only component to have access to the secure memory, in order to ensure the confidentiality and integrity of the data recorded in the secure memory.

The steps 12 and 13 can be implemented in parallel, or one after the other in any order whatsoever.

Once the current footprint Emp_C and the reference footprint Emp_Rf are known, the processor compares them in a step 14.

When the current footprint Emp_C is identical to the reference footprint Emp_Rf, a step 15 for validating the current application code CAC is implemented. By this step, the integrity of the application code is confirmed: in other words, the implementing of this step means that the current application code has not undergone unauthorized modifications. The code is therefore considered to be healthy, and uncorrupted. It is valid and can therefore undergo various authorized processing operations. According to the proposed technique, the step of validation comprises especially a step for carrying out a process 151 of optimization of the current application code of said application, delivering an optimized application code CAO. It is thus made sure that the optimizing of the code is done on a code that has integrity at the outset.

In the particular embodiment presented with reference to FIG. 2, two additional steps 152 and 153 are carried out during the step 15 of validation of the current application code. The step 152 is a step for determining a footprint of the optimized application code, delivering a post-optimization footprint Emp_PO associated with the application. The step 153 corresponds to a step for recording this post-optimization footprint Emp_PO in the secure memory of the electronic device, as a new reference footprint associated with said application. Indeed, when the current application code CAC has been verified as being valid (having integrity), making it possible to allow the optimization, and since the modifications made by the optimization process are not deemed to bring the integrity of the code into question, the optimized application code CAO, which corresponds to the new code of the application, is itself considered to have integrity. Hence, on the basis of this optimized code, a new reference footprint is computed, which replaces, in a secure memory, the former reference footprint which has become obsolete. Thus, during a subsequent implementation of the method for determining validity, or a subsequent iteration of the steps that compose it, the current footprint of the application will be compared to the last reference footprint recorded in the secure memory. The steps 152 and 153 are however not implemented systematically. Thus, there is no need for example to determine and then record a new reference footprint if the optimization process leads to no modification of the code on which it has been launched (for example because the application has already reached an optimal degree of optimization for the current use that the user makes of it, or because the application code has already undergone optimization a short time earlier, and a new optimization, very close in time to a previous optimization does not necessarily have any effect).

In one particular embodiment, when it is established at the end of the comparison step 14 that the current footprint Emp_C is different from the reference footprint Emp_Rf, a step 16 for implementing at least one protection measure is executed. This step for implementing at least one protection measure is aimed at least at alerting the user to the fact that the code of the application App installed on the electronic device has undergone an unauthorized modification. If necessary, the protection measures implemented can also consist of a blocking of any data transmission addressed to the incriminated application App, a blocking of access of the application App to the content of any memory of the electronic device, a partial or total blocking of the application App and even a blocking of the electronic device in its totality. These different protection measures, which are all particular embodiments of the proposed technique, can be deployed independently of one another or such that they complement one another In one particular embodiment, the code of the optimization process itself is subjected to a check of its integrity before this process is implemented. Indeed, inasmuch as the optimization process is led to analyzing the code of the applications installed in the electronic device, and inasmuch as it is allowed to carry out modifications of the code of these applications, this is a particularly vital process. Although the optimization process is generally considered to be secure at the time of its installation (because the installation packet within which it is included is electronically signed with a cryptographic key of the manufacturer of the electronic device for example and because this signature is verified at installation), it is still necessary to ensure that the code of this optimization process has not itself thereafter undergone unauthorized modifications (and in particular modifications of malicious origin). The same general principle as the one applied to determine the validity of the application code App can then be adopted to ensure this fact. Thus, the next steps can be implemented before any launch of the optimization process:

determining a current footprint of the code of the optimization process;
   obtaining, within the secure memory of the electronic device, a reference footprint associated with the optimization process; and
   comparing the current footprint of the code of the optimization process with the reference footprint associated with the optimization process.

The optimization process is executed only if the result of this comparison is that the current footprint is identical to the reference footprint. If not, the code of the optimization process is considered as being not trustworthy: it is therefore not executed and appropriate protection measures can then be implemented to warn the user and even to partially or totally block the electronic device.

5.2 Implementation of the Method

The method has been described in the general case with reference to the electronic device comprising a processor. The proposed technique can apply more specifically to electronic devices such as those described here below with reference to FIG. 2, which comprises two processors, one secure and one non-secure. The utility of such devices lies in their capacity to implement not only applications that are secure in that they have most frequently been certified by a trusted organization and are authorized for execution by the secure processor, but also third-party applications, not necessarily certified, that are executed on the non-secure processor.

The secure processor has access to the secure memory and the association of these two elements forms a secure execution environment within the device. The term "secure execution environment" refers to a securing that can be securing in both hardware and software terms, especially with the implementation of different protection techniques (physical constitution of the protection package for protecting of secure components, electronic circuits etched in the mass or multi-layered circuits, data encryption, etc.). This securing relies also on the use, in the secure processor, of a secure operating system in the sense that it has available a set of means (control means, access restriction means, cryptographic means, etc.) supposed to make it less vulnerable and to efficiently protect it against the different types of attacks that it could undergo. Conversely, the operating system implemented within the non-secured processor of the electronic device is a system that can be qualified as an "open-source system", in the sense that there is sufficient and widespread access to this system, fostering the development of numerous applications. These applications, when installed on the electronic device, are loaded into a non-secure memory to which the open-source exploitation system has access. The notion of a "open-source operating system" encompasses not only truly open-source exploitation systems such as the original UNIX and LINUX systems but also systems with widespread commercial distribution such as for example the different versions of the Android™ system. Among these operating systems, certain systems such as Android™ for example are provided with code optimizing functions working as background tasks which can correspond to the optimization process as described here above. These optimization processes consist for example of the continuous optimization of the executable code of the applications installed as a function of the use made of them, and therefore make it possible, over time, to generate an application code that has higher performance for the parts of the applications that are most often used.

In this context, the method according to the proposed technique can be initiated and implemented in different ways presented here below.

According to a first approach, corresponding to one particular embodiment, the implementing of the method for determining the validity of the code of an application is performed by means of a dedicated secure process executed within the secure processor. This secure process is constantly "listening" to the operations carried out by the non-secure processor, as a background task. When the dedicated secure processor detects that the non-secure processor is being called upon to execute the optimization process, it generates an interruption of the optimization process (software interruption or directly hardware interruption), which is then suspended so long as the integrity of the application code has not been confirmed at the level of the secure processor. The secure processor, which also has access to the non-secure memory, determines the current footprint associated with the application, obtains the reference footprint within the secure memory and compares these two footprints. If they are identical, the secure processor delivers a piece of data for validating the application code during the step of validation (for example in the form of a piece of Boolean type binary data), and it authorizes the resumption of the optimization process at the non-secure processor.

According to another approach, corresponding to another particular embodiment, it is a dedicated process executed within the non-secure processor that activates the implementing of the method for determining the validity of the code of an application. More particularly, before any execution of the optimization process, this dedicated process makes a call to a corresponding dedicated process or program executed within the secure processor, so that this processor determines the current footprint associated with the application (either by its own means, through an access to the non-secure memory or because the calling dedicated process executed at the non-secure processor sends it this information), obtains the reference footprint associated with the application within the secure memory and then compares these two footprints. If they are identical, the secure processor delivers a piece of data for validating the application code at the non-secure processor during the validation step, and the execution of the optimization process at the non-secure processor is then activated.

In the context of an electronic device comprising a secure processor and a non-secure processor, two main possible approaches to implementing the proposed technique may thus be distinguished: an approach according to which a suspension of the execution of the optimization process already initiated at the non-secure processor is implemented so long as the integrity of the current code of the application to be optimized is not established, and an approach according to which the optimization process is activated only if the integrity of the current code of the application to be optimized has already been established. Whatever the approach chosen, the steps that are considered to be critical from a security viewpoint remain within the exclusive perimeter of the secure processor. These are especially the steps requiring access to the secure memory (such as the step for obtaining the reference footprint associated with the application), the comparison step for comparing current footprints and reference footprints and the step for validating the current application code which delivers the validation piece of data. The step for determining the footprint of the current application code can for its part be implemented equally well by the secure processor or by the non-secure processor.

5.3 Device

FIG. 2 schematically represents the structure of an electronic device DE in one particular embodiment of the proposed technique. Only the components needed for an understanding of the present technique are represented in FIG. 2. Thus, certain constituent elements that generally form part of an electronic device such as a payment terminal have been deliberately omitted. This embodiment corresponds to the one presented here above, wherein the electronic device DE includes a secure processor PS and a non-secure processor PNS. Besides, a computer program PG comprises instructions for the execution of the steps of the method for determining a validity of a code of an application. At the initialization of the electronic device, the code instructions of the computer program PG are for example loaded into a memory and then executed, typically by the secure processor PS.

The electronic device DE also comprises a secure (or protected) memory MS and a non-secure memory MNS. The term "secure memory" is understood to mean a memory for which the access to the content is protected by an appropriate security mechanism. Such a mechanism makes it possible for example to verify the identity and/or the authenticity of a requesting party wishing to access data recorded in the secure memory in question. Typically, the secure memory MS is attached to the secure processor PS which has access to its content. The secure processor PS is especially capable of implementing a mechanism for securing data in the secure memory, comprising for example the erasure of the data in the event of infringement of the integrity of the data. The security mechanism can also be a hardware mechanism (a physical layer covering the memory to be protected, etc.). The non-secure memory PNS for its part does not have access to the content of the secure memory MS. The memory MNS on the other hand is a non-secure memory. In other words, the access to the content of the memory MNS is not protected, unlike the access to the content of the memory MS. Both the secure processor PS and the non-secure processor PNS can access the content of the non-secure memory MNS.

According to one embodiment of the proposed technique, the secure processor inputs for example a piece of information according to which a process of optimization of an application App loaded into the non-secure memory MNS of the electronic device DE is ready to be executed or has just been initiated at the non-secure processor PNS. The secure processor PS then implements the steps of the method for determining a validity of a code of an application, according to the instructions of the computer program PG and outputs a piece of validation data of the application code App (for example a piece of Boolean type binary data). To this end, as already explained here above, the secure processor PS compares a current footprint associated with the application App with a reference footprint Emp_Rf which it obtains in the secure memory MS. The current footprint associated with the application App is for its part determined from the application code loaded into the non-secure memory MNS. It is determined either by the secure processor PS itself or by the non-secure processor PNS which then transmits it to the secure processor PS. If the validity of the application code App is not established, the process of optimization of the application App is not carried out to its end, either because the optimization process is not executed (it is not launched) or because it has been suspended even before it had begun to carry out modifications of the application code App (for example by means of a software interruption coming from the secure processor). However, when the current footprint associated with the application App is identical to said reference footprint Emp_Rf, the code of the application App is considered to have integrity (to be valid) and the optimization process can then be carried out to its end so as to deliver, if necessary, an optimized application code for the application App.

The electronic device DE furthermore comprises, in one particular embodiment, means for implementing the proposed technique, especially:
- means for loading an application into said non-secure memory, delivering a current application code;
- means for determining a footprint of said current application code, delivering a current footprint associated with said application;
- means for obtaining, within said secure memory, a reference footprint associated with said application;
- means for comparing the current footprint with the reference footprint; and
- means for validating said current application code implemented when said current footprint is identical to said reference footprint, said means for validating comprising means for executing a process of optimization of the current application code of said application, delivering an optimized application code.

In one particular embodiment, the electronic device is a payment terminal.

Although the present disclosure has been described with reference to one or more examples, workers skilled in the art will recognize that changes may be made in form and detail without departing from the scope of the disclosure and/or the appended claims.

The invention claimed is:

1. A method for determining a validity of a code of an application, said method being implemented within an electronic device comprising a non-secure processor, a secure processor, a non-secure memory and a secure memory, wherein said method comprises at least one iteration of the following:
- loading, by the non-secure processor, said application in said non-secure memory, delivering a current application code;
- detecting, by the secure processor, a call for the non-secure processor to execute an optimization process of the application; and
- upon detecting the call to execute the optimization process, implementing, by the secure processor, the following:
  - generating an interruption of the optimization process;
  - determining a footprint of said current application code, delivering a current footprint associated with said application;
  - obtaining, within said secure memory, a reference footprint associated with said application;
  - comparing said current footprint with said reference footprint; and
  - in response to said current footprint being identical to said reference footprint, validating said current application code, comprising:
    - authorizing resumption of execution, at the non-secure processor, of the optimization process of the current application code of said application, said execution delivering an optimized application code;

determining a footprint of said optimized application code, delivering a post-optimization footprint associated with said application; and recording said post-optimization footprint in said secure memory as a new reference footprint associated with said application.

2. The method according to claim 1, further comprising initializing said reference footprint, implemented during an installation of said application on said electronic device.

3. The method according to claim 2, wherein the initializing the reference footprint comprises:

verifying a signature of at least one installation packet of said application; and when said verification of a signature is positive:
obtaining a first reference footprint for said application; and
recording said first reference footprint in said secure memory.

4. The method according to claim 1, further comprising, when said current footprint is different from said reference footprint, implementing at least one protection measure.

5. The method according to claim 4, wherein said at least one protection measure belongs to the group consisting of:

displaying a warning message on a screen of said electronic device;
blocking any data transmission addressed to said application;
blocking said application;
blocking said electronic device.

6. The method according to claim 1, wherein the current footprint and the reference footprint associated with said application are determined by implementing a hash function.

7. The method according to claim 1, further comprising, prior to said executing an optimization process, verifying the integrity of the code of the optimization process comprising:

determining a footprint of the code of said optimization process, delivering a current footprint associated with said optimization process;
obtaining, in said secure memory, a reference footprint associated with said optimization process;
comparing said current footprint associated with the optimization process with said reference footprint associated with the optimization process; and
when the current footprint associated with the optimization process is identical to the reference footprint associated with the optimization process, implementing said executing said optimization process;
when the current footprint associated with the optimization process is different from the reference footprint associated with the optimization process, suspending the executing said optimization process.

8. The method according to claim 1, wherein the method further comprises:

perform at least two iterations of:
detecting the call to execute the optimization process; and
performing the generating, determining, obtaining and comparing for the current application code upon detecting the call.

9. A electronic device comprising:
a non-secure processor and a secure processor,
a non-secured memory and a secure memory,
the non-secure processor being configured to load an application into said non-secure memory delivering a current application code; and the secure processor being configured to:
detect a call for the non-secure processor to execute an optimization process of the application; and
upon detecting the call to execute the optimization process;
generate an interruption of the optimization process;
determine a footprint of said current application code delivering a current footprint associated with said application;
obtain, within said secure memory, a reference footprint associated with said application;
compare said current footprint with said reference footprint; and
in response to said current footprint being identical to said reference footprint, validating said current application code, said validating comprising:
authorizing resumption of execution, at the non-secure processor, of the optimization process of the current application code of said application, said execution delivering an optimized application code;
determining a footprint of said optimized application code, delivering a post-optimization footprint associated with said application; and
recording said post-optimization footprint in said secure memory as a new reference footprint associated with said application.

10. A non-transitory computer-readable medium comprising a computer program product stored thereon, which comprises program code instructions for executing a method of determining a validity of a code of an application, when the instructions are executed by at least one processor of an electronic device comprising a non-secure processor and a secure processor, the electronic device comprising a non-secure memory and a secure memory, the instructions configuring the device to implement at least one iteration of the following:

loading, by the non-secure processor, said application in said non-secure memory, delivering a current application code;
detecting, by the secure processor, a call for the non-secure processor to execute an optimization process of the application; and
upon detecting the call to execute the optimization process, implementing, by the secure processor, the following:
generating an interruption of the optimization process;
determining a footprint of said current application code, delivering a current footprint associated with said application;
obtaining, within said secure memory, a reference footprint associated with said application;
comparing said current footprint with said reference footprint; and
in response to said current footprint being identical to said reference footprint, validating said current application code, comprising:
authorizing resumption of execution, at the non-secure processor, of the optimization process of the current application code of said application, said execution delivering an optimized application code;
determining a footprint of said optimized application code, delivering a post-optimization footprint associated with said application; and recording said post-optimization footprint in said secure memory as a new reference footprint associated with said application.

* * * * *